United States Patent Office 3,317,841
Patented May 2, 1967

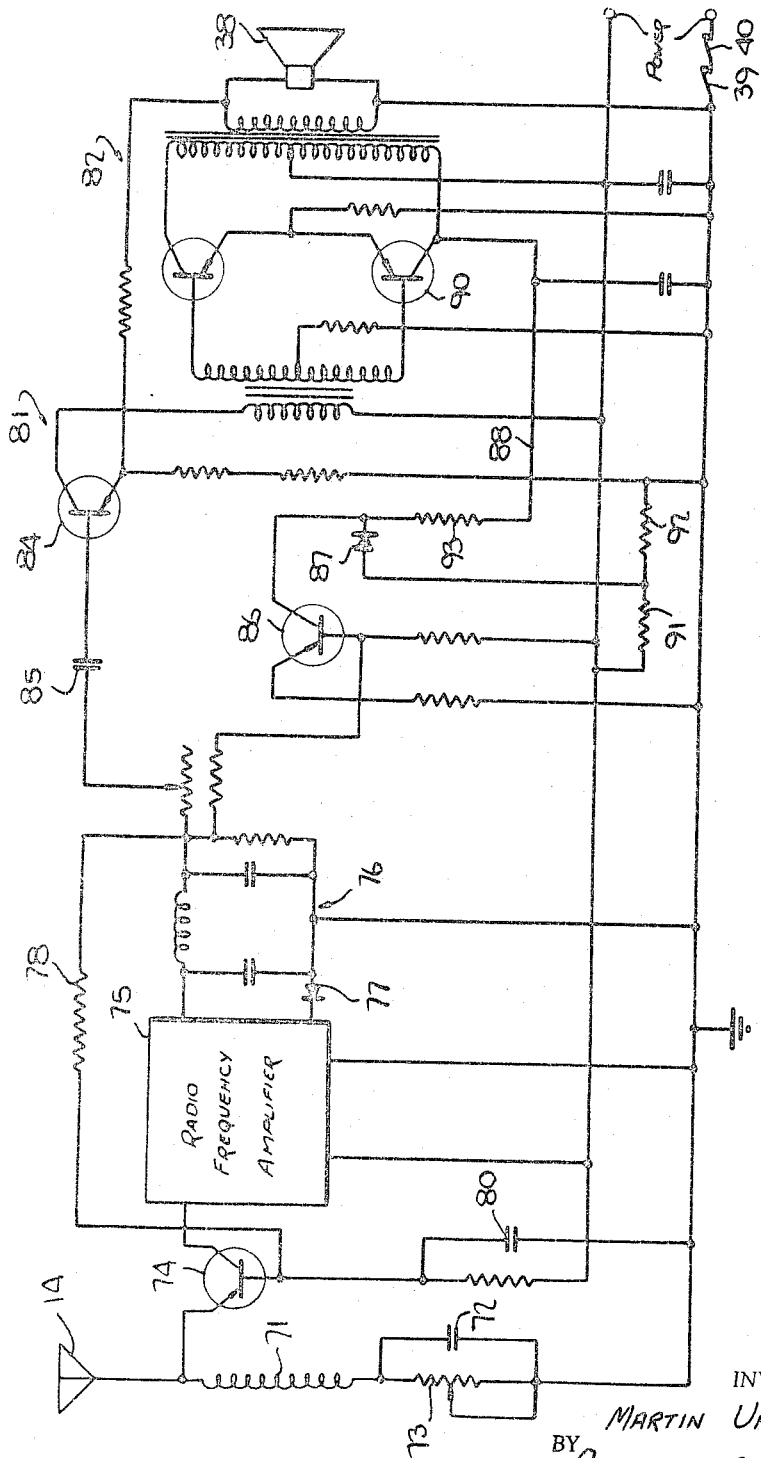

3,317,841
RADIO RECEIVER WITH ALARM MEANS OPERATIVE WHEN INPUT SIGNAL IS BELOW PREDETERMINED LEVEL
Martin Umanoff, Huntington, N.Y., assignor, by mesne assignments, to R. A. MacPlum Industries, Inc., a corporation of New Jersey
Original application Mar. 21, 1960, Ser. No. 16,206, now Patent No. 3,157,871, dated Nov. 17, 1964. Divided and this application Mar. 17, 1964, Ser. No. 352,598
2 Claims. (Cl. 325—364)

This invention relates to alarm systems, and more particularly to such systems wherein the warning signal is engendered electronically.

It is a general object of the invention to provide a system, adapted to be carried by a mobile unit, for sounding an alarm should the mobile unit be withdrawn from a prescribed area.

This application is a division of co-pending application Ser. No. 16,206, filed Mar. 21, 1960, now Patent No. 3,157,871, issued Nov. 17, 1964. In that application, there is described an improved shopping cart provided with a radio receiving apparatus by means of which advertising messages and other information may be transmitted to the user of the cart from a local broadcasting equipment.

A specific objective of this invention is to provide a solution to the problem with which markets are confronted, arising from inadvertent, often deliberate, removal of carts from premises. To minimize such losses, it is an object of the invention to provide a practical and effective warning signal system which becomes operative automatically whenever a cart is transported beyond certain predetermined bounds. Toward this end, the invention contemplates the provision of a raucous alarm in association with each cart, in combination with a means which automatically normally maintains the alarm ineffective, but which makes the alarm effective when the cart is moved beyond a prescribed area.

One of the special features of the invention resides in the employment of the radio receiving apparatus previously mentioned as a means for controlling the alarm device. In accordance with the invention, the operation of the alarm is controlled by the strength of the signal received by the apparatus. Thus, if there is a focal radio broadcasting equipment whose signal is only of local strength, diminishing rapidly at increasing distances from its source, it is possible to maintain the alarm ineffective whenever the signal received by the radio apparatus is of predetermined strength, and to cause the alarm to become effective whenever the received signal falls below a predetermined minimum strength.

Another feature of the invention resides in the incorporation of the warning signal within the radio receiving apparatus itself. Preferably the apparatus includes an electrically supressable howling circuit which is automatically allowed to become effective whenever the cart or other mobile unit with which the invention is associated is moved beyond a certain distance from the broadcasting source.

The carts described in the above-mentioned co-pending application are of the kind which may be telescopically nested. Each cart is provided with a normally operative radio receiving apparatus, and a means which is automatically effective to render the receiving apparatus inoperative when the cart is nested with another. Preferably, this automatic means involves a normally closed switch in the radio, coupled with cooperable means carried by each pair of carts for opening the switch of one of them when they are nested. Each cart is also provided with a key-actuatable means whereby the radio unit may be independently shut off by authorized personnel.

One way of achieving these objects and advantages, and such other objectives and benefits as may hereinafter appear or be pointed out, is illustrated in the accompanying drawing.

The drawing is a schematic circuit diagram showing the nature of the warning signal and its control.

In the circuit shown, the antenna 14, which may be the metal framework of the shopping cart, is connected in series with a pre-tuned resonant circuit 71, 72. A volume control 73 comprises a variable resistor shunted across the capacitor 72. The antenna is connected through a transistor 74 to a standard radiofrequency amplifier 75, the output of which is applied to a detector circuit 76. The detector circuit includes a diode rectifier 77 and a filter circuit which includes a series connected inductor and two parallel connected capacitors. The output of the detector circuit comprises a direct current voltage proportional to the amplitude of the received signal and an audiofrequency component proportional to the modulation of the radiofrequency signal.

In order to maintain a substantially constant volume at the loudspeaker 38, a negative feed-back is provided from the output of the detector 76 to the base of transistor 74. The audiofrequency is eliminated from this circuit by series resistor 78 and shunt capacitor 80, and only the direct current component is applied to the base of the transistor 74.

The audiofrequency circuit includes a first audio transistor stage 81 and a second push-pull audio stage 82 connected to the speaker 38. The first audio stage includes a transistor 84 with its base connected to the detector circuit in series with a capacitor 85 which eliminates the direct current from the audio signal.

A feature of the audio amplifier lies in an oscillating or howling circuit which is normally rendered inoperative by the direct current produced by the detector circuit. When no signal (or only a very weak signal) is received by the antenna, no (or insufficient) direct current is available from the detector and the oscillating circuit operates to produce a loud raucous tone from the speaker. The oscillating circuit includes both stages of audiofrequency 81 and 82 and a positive feed-back circuit comprising a transistor 86 and a bias diode 87. The cathode of the diode is connected by conductor 88 to a collector of one of the transistors 90 in the push-pull stage 82. The cathode is also connected to the collector of control transistor 86, and the anode of the diode is connected to the midpoint of a voltage divider 91, 92 bridged across the power supply. The base of transistor 86 is connected to the detector circuit (and to ground), while the emitter is connected to ground only.

When the circuit is operating and receiving a normal radio signal, the detector provides a direct current voltage which biases the base of transistor 86 and makes it conductive, passing direct current from conductor 88, through resistor 93, to the collector and the emitter in transistor 86, to ground. This direct current produces a voltage drop across resistor 93 which makes diode 87 conducting and diverts the audiofrequency from transistor 90 to ground through resistor 92. Since the A.C. from the push-pull stage cannot get back to the input circuit of transistor 84, the circuit does not oscillate.

When there is no signal received by the antenna, or when the signal is weak, the base of transistor 86 is biased to cut-off, and the direct current through conductor 88 is reduced, raising the voltage of one side of the diode so that it is made non-conductive. The audio signal from transistor 90 flows through the collector base electrodes of transistor 86, then through capacitor 85, to the input base electrode of the first audio stage transistor, and positive feed-back is established, causing the audio amplifier to oscillate and thus produce the warning signal.

It is thus apparent that when the cart is in use within the supermarket, no sounds emanate from the speaker 38 except the advertising or other message received from the focal broadcasting equipment within or closely adjacent to the market. However, should the patron inadvertently or deliberately move the cart beyond the proper distance from its area of use, the weakening of the received signal will result in activation of the warning signal, thus alerting the patron himself, as well as others, to the circumstance that the cart has been removed beyond authorized limits.

A disconnect switch 39 is adapted to be opened, thereby cutting off power from the source to the radio, when another shopping cart is nested within the cart carrying the radio. The power source may be a battery. Means for accomplishing this are described in full in the above-mentioned co-pending application for patent. A key-actuatable switch 40 may also be employed to turn off the radio. The "ground" connection may be established by an electrical connection to the chassis (not shown) of the radio unit.

In many respects it will be understood that the details herein described and illustrated may be altered by those skilled in the art, without necessarily departing from the spirit and scope of the invention as expressed in the appended claims.

What is claimed is:

1. An alarm circuit for a radio receiver which operates to produce an oscillation when the radio input falls below a predetermined level comprising: a radio frequency amplifier-detector circuit which generates a direct current signal proportional to the radio input; an audiofrequency amplifier having its input coupled to said detector and also having a positive feed-back circuit including a transistor having a collector and also a base connected both to the output side of said detector and to ground and having also an emitter connected only to ground, said feed-back circuit being coupled between the output and input circuits to produce oscillation; and a control circuit including a biased diode connected across a portion of said feed-back circuit for short-circuiting the feed-back current when the diode is made conducting, said diode having its cathode connected to said collector of said transistor thus to be coupled through collector to base of said transistor to the detector circuit for control of its bias voltage.

2. In an alarm system of the character described, a radiofrequency amplifier, detector circuitry connected to be supplied from the output side of said amplifier, an audio amplifier supplied from said detector circuitry and functional as an oscillator and embodying a first audio transistor stage and an associated push-pull stage, a positive feed-back circuit connected to apply signals from said push-pull stage to the input side of said first audio transistor stage thus to cause said audio amplifier to oscillate, said feed-back circuit including a control transistor having a collector and having a base connected both to the output side of said detector circuitry and to ground and having an emitter connected only to ground, said feed-back circuit including a diode connected between the output side of said push-pull stage and ground and functional only when conductive to complete the ground connection for audiofrequency signals from said push-pull stage, said control transistor being functional to render said diode non-conductive responsive to occurrence of a predetermined low-level signal-input to said detector circuitry thus to complete said positive feed-back connection and cause said audio amplifier to function as an oscillator.

No references cited.

KATHLEEN H. CLAFFY, *Primary Examiner.*

R. S. BELL, *Assistant Examiner.*